June 28, 1932.   R. ACIERNO   1,865,158
WINDSHIELD WIPER
Filed May 31, 1930   2 Sheets-Sheet 2
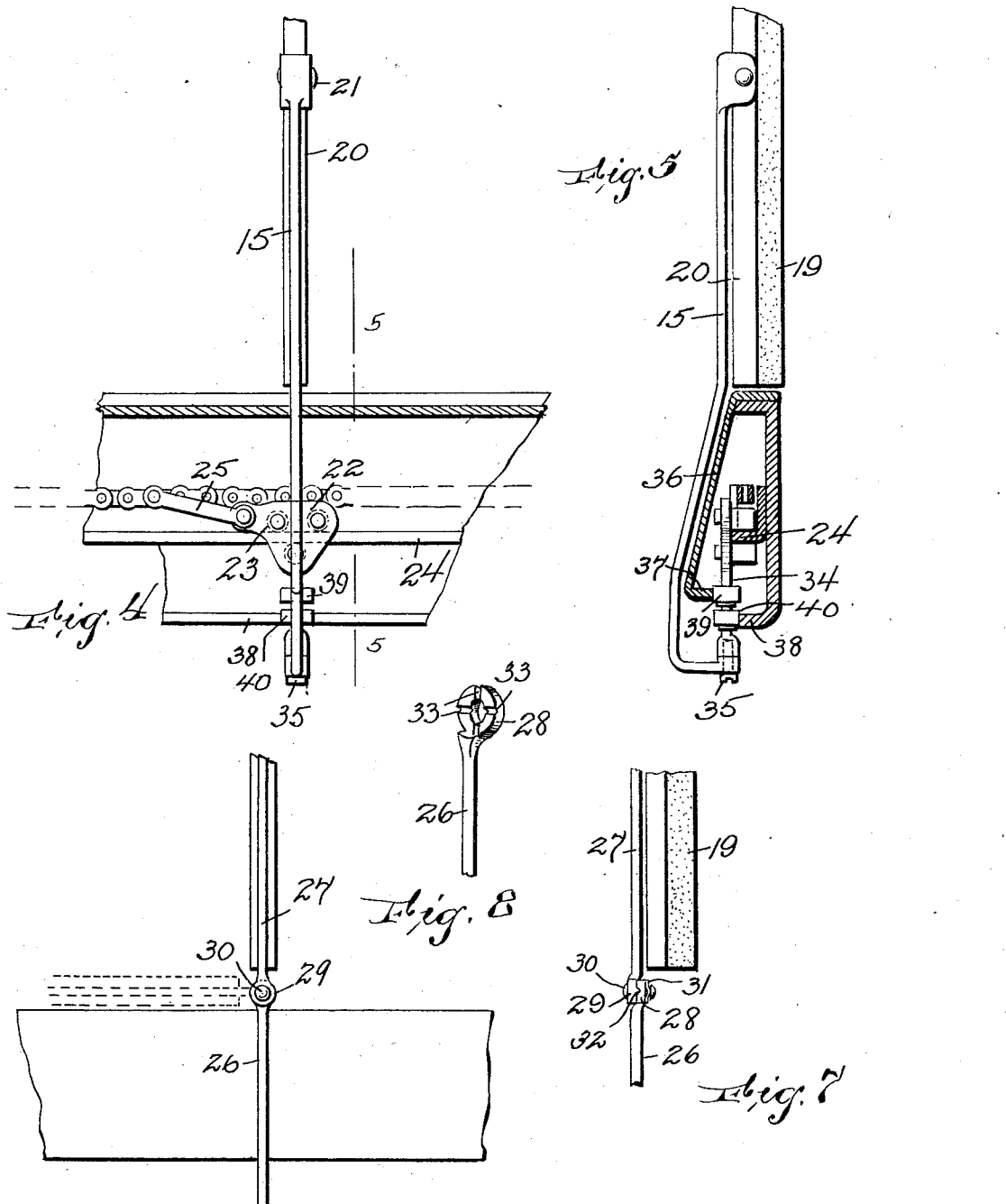
INVENTOR
Rocco Acierno,
BY
Wm. H. Campfield
ATTORNEY Patented June 28, 1932

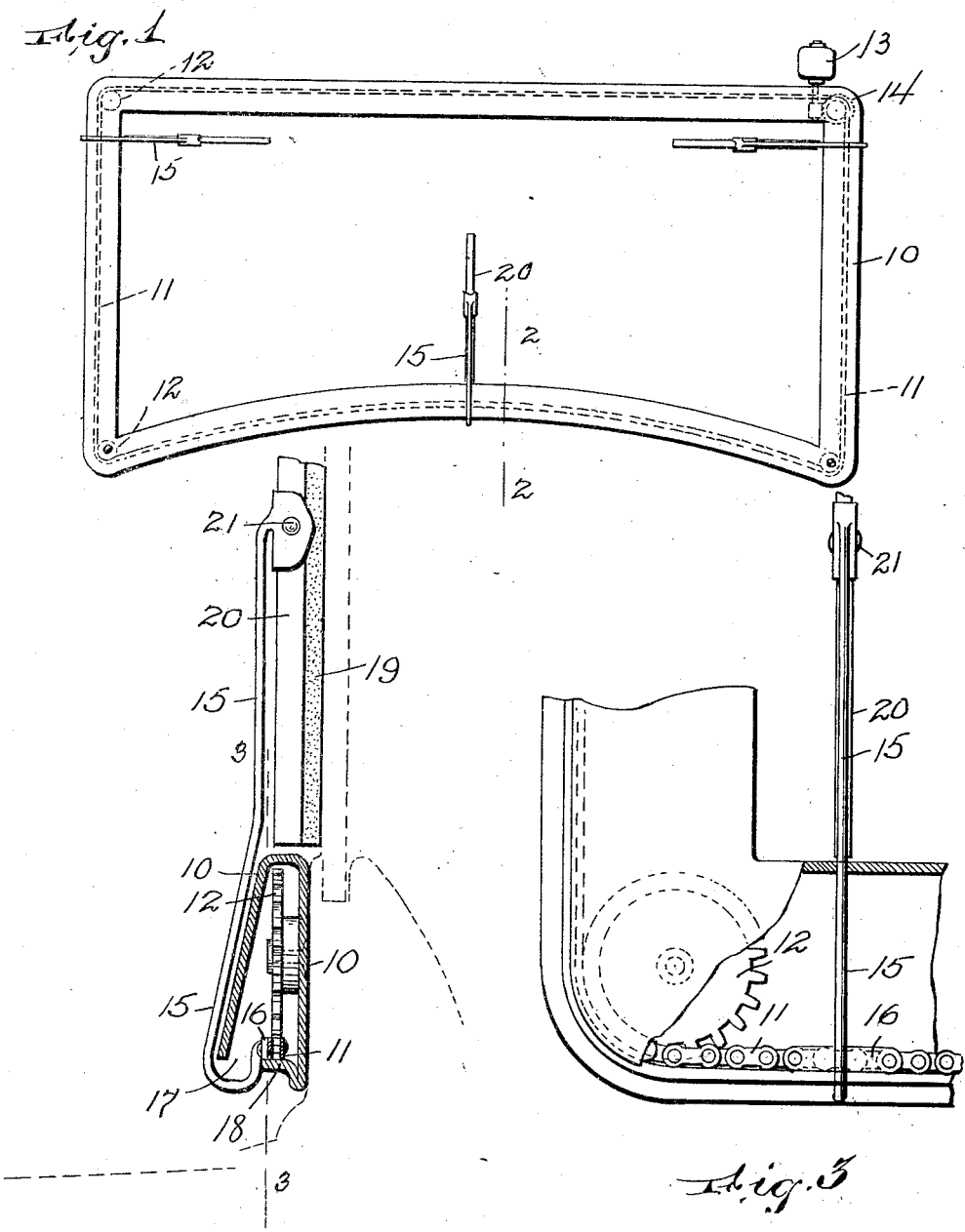

1,865,158

UNITED STATES PATENT OFFICE

ROCCO ACIERNO, OF NEWARK, NEW JERSEY

WINDSHIELD WIPER

Application filed May 31, 1930. Serial No. 458,269.

This invention relates to a wind-shield wiper which wipes practically the entire surface of the glass in the wind-shield.

The object of the invention is to provide a wiper which has one or more wiping elements, usually of rubber, and a means for supporting and propelling the elements or element in a continuous path in order that the wiping is continuous and in one direction and covers the whole glass pane in the wind-shield.

The invention is illustrated in the accompanying drawings, in which Figure 1 is a front view of wiper embodying my invention. Figure 2 is a section through line 2—2 in Figure 1. Figure 3 is a section on line 3—3 in Figure 2. Figure 4 is a section similar to Figure 3 but showing a modified form of mounting and connection for the wiping element. Figure 5 is a section on line 5—5 in Figure 4. Figure 6 is a front view of part of the frame and of a wiping element of modified form. Figure 7 is a side view of the arm shown in Figure 6. Figure 8 is a perspective view of one member of the joint used in the arm shown in Figures 6 and 7.

The wind-shield wiper comprises a frame 10 which is secured to the frame of the windshield in any suitable manner. The frame is hollow and contains a strand which is supported in a manner that allows it to travel in the frame. The strand is shown at 11 and is flexible to turn at the corners of the frame. I may use a thin cable but I prefer to use a sprocket chain which passes around the sprocket wheels 12 at the corner of the frame. One of these wheels is used for power and is driven by suitable means such as the small motor 13 connected by gears 14 to the axle of one of the sprockets. The strand is used to propel the wiping elements in a continuous path to wipe the glass in the wind-shield. The elements are mounted on and include arms 15 which can be connected directly to the chain by the plates 16. The arms pass through a slit in the frame, the slit 17 being situated preferably on the outer edge of the frame and the arms are bent around to engage the chain.

The lower reach of the frame and of the strand are curved in the usual form of motor car to conform to the curved frame of the wind-shield and the top of the cowl. The chain and the plate 16 are supported to conform to this curve. I show the rib 18, bent up from the material of the frame and on which the sprocket chain travels. This holds the chain from the cowl and also out of view. The wiping elements also include the usual rubber strip 19 having a proper backing 20 and pivotally secured at 21 to the end of the arm 15. The limited flexibility of the arms 15, the relatively loose connection at 21 and the resiliency of the rubber wiper 19 allow for a free and easy turning of the arm around the sprocket wheels 12 when the wiping elements arive at the corners of the wind-shield.

In Figures 4 and 5, I secure the arm 15 of the wiping element to a carriage 22 which has rollers 23 over and under the rib 24 of the frame. The carriage is thus held firmly to its path and is connected to the chain 11 by a link 25. The arm 15 is preferably detachably secured to the lower end of the extension 34 of the carriage 22 as by the screw 35. The front apron or wall 36 of the frame is bent inwardly to form a flange 37 and the rear wall has a bottom flange 38 also bent inwardly. The rollers 39 and 40 are rotatably arranged on the extension 34 and ride on the ends of the flanges 37 and 38 respectively. This construction is calculated to provide a stiffness and steadiness necessary in some of the heavy types of wipers.

In case the wiping elements are to be swung out of the way alongside of the frame I provide a joint in the arm 15. One such joint is shown in Figures 6 and 7. The arm is composed of two members 26 and 27 with respective knuckles 28 and 29 and a pintle 30 and a spring washer 31. The knuckle 29 has projections 32 and the knuckle 28 has the detents 33 in which the detents rest. This construction holds the arm either folded or straight but allows an adjustment of the arms to make the wipe effective or ineffective as desired. When the wiper is put in operation, as each arm reaches a corner of the frame it is swung to operative extended position.

I claim:—

A wind-shield wiper comprising a wind-shield frame having a strand movable around it and wiper propelled by the strand and traversing the wind-shield continuously in one direction.

In testimony whereof he affixes his signature.

ROCCO ACIERNO.